United States Patent [19]

Kohler

[11] 4,246,989

[45] Jan. 27, 1981

[54] PARKING BRAKE AND TRANSMISSION INTERLOCK SYSTEM

[75] Inventor: Ramon C. Kohler, Aurora, Ill.

[73] Assignee: Caterpillar Tractor Co., Peoria, Ill.

[21] Appl. No.: 967,542

[22] Filed: Dec. 7, 1978

[51] Int. Cl.³ .................. B60K 41/26; F16D 67/02
[52] U.S. Cl. .................... 192/4 A; 74/110; 74/520; 180/271; 303/9
[58] Field of Search ............ 192/4 A, 4 R, 114 B, 192/3 T, 13 R; 74/110, 520; 180/271; 303/9

[56] References Cited

U.S. PATENT DOCUMENTS

| | | | |
|---|---|---|---|
| 3,181,667 | 5/1965 | Lohbauer et al. | 192/13 R X |
| 3,858,695 | 1/1975 | Whisler | 192/4A |
| 3,972,398 | 8/1976 | Chamberlain | 192/4 A |
| 3,990,541 | 11/1976 | Dobrinska et al. | 192/4 A X |
| 4,049,096 | 9/1977 | Barth | 192/13 R X |

Primary Examiner—Leslie Braun
Assistant Examiner—Moshe I. Cohen
Attorney, Agent, or Firm—Wegner, Stellman, McCord, Wiles & Wood

[57] ABSTRACT

A parking brake and transmission interlock system including a transmission control element (30) movable between at least two opposed drive positions and an intermediate neutral position, a parking brake control element (14–22) movable between engaged and disengaged positions, a stop (36) having two stop surfaces (38,40) connected to the transmission control element (30), to be movable therewith between the drive and neutral positions, a pair of movably mounted abutments (52,56) each confronting a respective one of the stop surfaces (38,40) and engageable therewith, a spring (58) biasing each of the abutments (52,56) toward its associated stop surface (38,40) to engage the same and urge the stop (36) toward the neutral position, and a fluid motor (64) responsive to the positioning of the brake control element (14–22) in the disengaged position for moving the abutments (52,56) away from the associated stop surfaces (38,40) so that the transmission control element (30) may be freely moved between the drive and neutral positions.

7 Claims, 3 Drawing Figures

U.S. Patent
Jan. 27, 1981
4,246,989
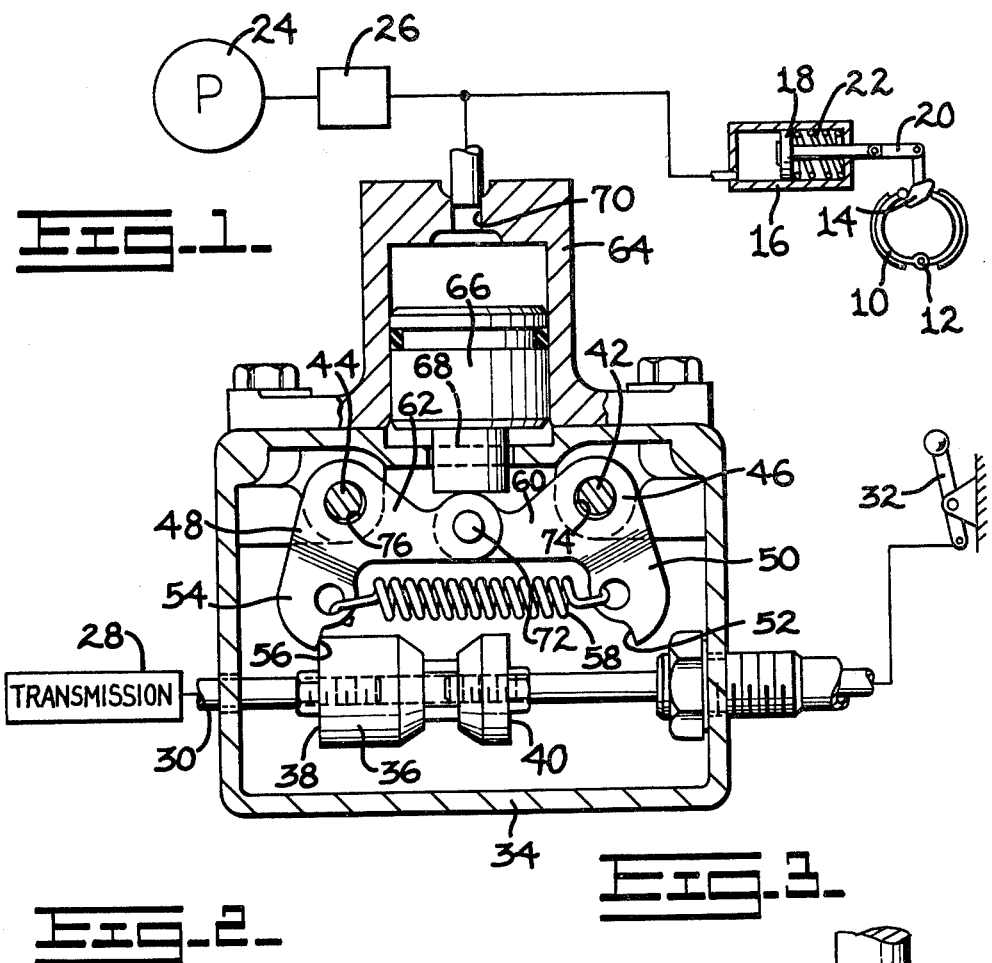
Fig.1.
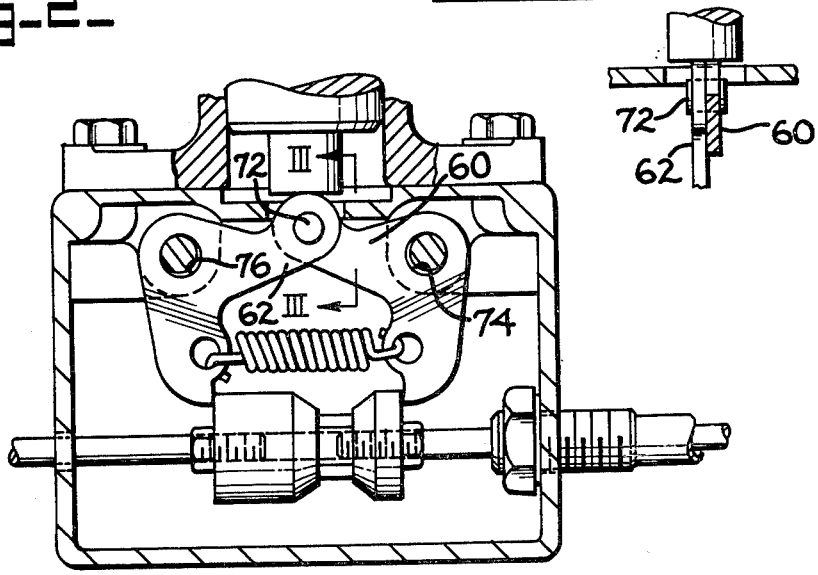
Fig.2.
Fig.3.

PARKING BRAKE AND TRANSMISSION INTERLOCK SYSTEM

DESCRIPTION

1. Technical Field

This invention relates to parking brake and transmission interlock systems for use in vehicles.

2. Background Art

Most vehicles in use today include parking brakes which are adapted to be engaged whenever the vehicle is to remain stationary for any period of time. Because of the time lapse involved, all too frequently an inattentive operator will forget that the parking brakes have been set and subsequently attempt to drive the vehicle under its own motive power while the parking brakes are set. This, of course, increases the wear rate of the brakes and, in some cases, may cause severe damage to the parking brakes to the point where they become inoperative.

As a consequence, many systems have been devised to provide some sort of indication to the operation of the vehicle that the parking brakes are engaged so that he will disengage them prior to driving the vehicle. Such systems have to be quite satisfactory, but many are oversimplified and some are unduly complex.

The problem of providing an adequate system becomes compounded where it becomes necessary, as for example, during emergency situations, to override the interlock system and drive the vehicle against the set parking brake. Where the interlock system includes a positive interlock, preventing the vehicle transmission from being engaged, overriding of the interlock may be mechanically impossible. In other cases, where a positive interlock is not provided, a warning device may be unheeded at times when it is not desired to drive the vehicle against the engaged parking brake. In still other systems wherein the operator of the vehicle is positively provided with an indication that the parking brake is engaged when he attempts to engage the transmission and drive the vehicle against the brakes, there may be no means to return the transmission to a neutral position as soon as the intentional overriding of the interlock system is completed. And, in many cases, components utilized are unduly complicated and therefore quite expensive, prohibiting their widespread use.

DISCLOSURE OF INVENTION

The present invention is directed to overcoming one or more of the above problems.

In one aspect of the present invention, there is provided a parking brake transmission interlock system including a transmission control element movable between at least two positions including a neutral position and a drive position. A parking brake control element is movable between engaged and disengaged positions and a stop is connected to the transmission control element to be movable therewith between the neutral and drive positions. At least one movably mounted abutment confronts the stop and means are provided for biasing the abutment towards a position engaged with the stop to urge the stop to the neutral position, thereby urging the transmission control element to the neutral position. The biasing means is such as to allow the stop to be moved against the bias from the neutral position to the engaged position to allow overriding of the interlock system with the force required to overcome the bias providing a perceptible indication to the operator of the fact that the parking brake is engaged. Means interconnect the abutment and the brake control element for moving the abutment out of engagement with the stop when the brake control element is in the disengaged position.

BRIEF DESCRIPTION OF DRAWINGS

FIG. 1 is a partial schematic, partial sectional view of an embodiment of a parking brake and transmission interlock system made according to the invention and illustrating the configuration of the components when the parking brake is disengaged.

FIG. 2 is a view similar to FIG. 1, but fragmentary in nature and illustrating the configuration of the components when the parking brake is engaged.

FIG. 3 is a fragmentary sectional view taken approximately along the line 3—3 in FIG. 2.

BEST MODE FOR CARRYING OUT THE INVENTION

An exemplary embodiment of a parking brake and transmission interlock system is illustrated in the drawings and from the following description it will be appreciated that the exemplary embodiment is specifically intended for use in large vehicles of the type wherein a parking brake automatically engages upon a system failure or upon shutdown of the vehicle. Typically, such systems employ a spring-engaged, hydraulically-disengaged parking brake, although they could be pneumatically operated as well. However, it is to be understood that the principles of the invention are applicable to other parking brake systems of a less complex nature. With the foregoing in mind, a preferred embodiment of the invention will now be described.

With reference to FIG. 1, conventional brake linings 10 forming part of a parking brake are illustrated and are pivotally interconnected at 12. A lever-operated cam 14 is rotatable between opposite ends of the brake lining to spread the same and engage them firmly with a brake drum not shown. The cam 14 may be rotated between positions engaging and disengaging the brakes by a fluid motor 16 having a piston 18. The piston 18 is connected via a link 20 to the cam 14, and a spring 22 normally urges the piston 18 to a position whereat the cam 14 has caused the linings 10 to engage the brake drum. However, when fluid is applied to the piston 18, the same is moved against the bias of the spring 22 to a position such as that shown in FIG. 1 whereat the brake linings 10 are disengaged from the drum.

Pressurized fluid for driving the piston 18 may be provided by a pump 24 via a control valve 26. It will be appreciated that whenever the pump 24 is inoperative as, for example, when the vehicle engine is shut down, the parking brake will automatically become engaged. At the same time, should there be a failure in the fluid system as, for example, caused by an extensive leak or a rupture in one of the lines, the brake will automatically engage.

The vehicle will include a transmission, shown schematically at 28, and a transmission control element 30, which can be manipulated by the operator of the vehicle through a handle 32, is provided. As is well known, the control element 30 will typically be movable between at least two opposed drive positions as, for example, commanding forward and reverse. An intermediate, neutral position can also be assumed by the transmission control element 30 whereat the transmission 28 will be disengaged.

The transmission control element 30 extends through a housing 34 and is reciprocal therein in a substantially linear path. Within the housing the transmission control element 30 mounts a stop 36 in the form of a collar having opposed stop surfaces 38 and 40. Within the housing 34 and above the transmission control element 30, there are a pair of spaced pivots 42 and 44 which extend generally transversely to the length of the transmission control element 30. The pivots 42 and 44, respectively, pivotally mount bellcranks 46 and 48 at locations intermediate the ends of the bellcranks 46 and 48.

The bellcrank 46 includes a depending leg 50 terminating in a nose or abutment 52 which faces the stop surface 40. The bellcrank 48 includes a similar leg 54 which terminates in an abutment 56 facing the stop surface 38. A tension spring 58 interconnects the legs 50 and 54 of the bellcranks 46 and 48 and accordingly urges the abutments 52 and 56 toward each other and toward their associated stop surfaces 40 and 38. When the bellcranks 46 and 48 are free to move under the influence of the spring 58, they will assume the configuration shown in FIG. 2 wherein the abutments 52 and 56 are engaged with the stop surfaces 40 and 38, respectively, to thereby locate the stop 36 in the neutral position of the transmission control element 30.

In this connection, FIG. 1 illustrates the configuration of the bellcranks 46 and 48 when their abutments 52 and 56 are in maximum spaced relation. It will be appreciated that the abutments 52 and 56 remain within the path of movement of the stop 36 for their extreme positions of intermediate movement between those illustrated in FIGS. 1 and 2, respectively. As a consequence, regardless of the position of the stop 36, whenever the bellcranks 46 and 48 are free to move under the influence of the spring 58, the abutments 52 and 56 will engage the collar to return the same and, thus, the transmission control element 30, to the neutral position so long as no sufficient resisting force is applied to the handle 32 by the operator of the vehicle.

The bellcrank 46 includes a second leg 60 which is directed toward a similar second leg 62 on the bellcrank 48. The arrangement is such that the ends of the legs 60 and 62 overlap.

The housing 34 on its upper surface mounts a fluid motor 64 including a reciprocal piston 66. The piston 66 mounts a rod 68 which is in alignment with the ends of the legs 60 and 62 of the bellcranks 46 and 48.

A port 70 in the fluid motor 64 above the piston 66 is connected to the fluid system for the parking brake downstream of the valve 26.

In a preferred embodiment, the legs 60 and 62 of the bellcranks 46 and 48 are pivotally connected together by a pin 72 to insure that the full force of the spring 58 will act on the bell cranks and urge them toward the position shown in FIG. 2. To allow employment of the pin 72 for this advantageous purpose and yet permit the bellcranks 46 and 48 to rotate through their designated arc, apertures 74 and 76 in the bellcranks 46 and 48 through which pivots 42 and 44 extend are made larger than the pivots 42 and 44. Thus the bellcranks 46 and 48 may laterally shift or spread during rotation as the pin 72 moves from one side of a line between the pivots 42 and 44 to the other.

Whenever the valve 26 is directing pressurized fluid to the brake to cause the same to be disengaged, it will similarly direct pressurized fluid to the fluid motor to drive the piston 66 downwardly. This, in turn, will cause the rod 68 to engage the legs 60 and 62 of the bellcranks 46 and 48 to move the same to the position illustrated in FIG. 1. At this time, the transmission control element 30 is relatively freely movable between its drive and neutral positions as commanded by the operator of the vehicle without expending undue effort in operating the handle 32. This, of course, is highly desirable during normal operation of the vehicle which would be the case when the parking brake is disengaged.

Conversely, when the parking brake is engaged for any reason, whether it be by closure of the valve 26, inoperability of the pump 24 due to failure thereof, the shutdown of the vehicle engine, or a major leak in the fluid system so that there is insufficient pressure to disengage the parking brake, the bias of the spring 58 will cause the bellcranks 46 and 48 to assume the configuration illustrated in FIG. 2, driving the piston 66 upwardly since there will be insufficient fluid pressure to drive the same downwardly. This, in turn, will automatically cause the transmission control element 30 to move to its neutral position to disengage the transmission 28. As a consequence, under normal circumstances, the vehicle cannot be moved by engaging the transmission when the parking brake is engaged.

Should the operator of the vehicle forget that the parking brake is engaged, and attempt to engage the transmission 28 through operation of the handle 32, he will be immediately apprised of the fact that the parking brake is engaged by reason of the resistance to movement of the transmission control element 30 provided by the bias of the spring 58 ultimately applied to stop 36. In this connection, if desired, other signals could be utilized as well. For example, a switch could be so located within the housing 34 so as to be closed whenever the bellcranks 46 and 48 are in the position illustrated in FIG. 2 to energize a warning light, a warning horn, etc.

Should an emergency arise wherein it is desirable to move the vehicle notwithstanding the parking brake is engaged and it is impossible to disengage the brake through the fluid system or by other means, the operator may nonetheless engage the transmission 28 through operation of the handle 32. This is due to the fact that the stop 36, and thus the transmission control element 30, is not positively restrained in the neutral position whenever the parking brake is engaged, but is only resiliently urged to that position by the bias of the spring 58. By applying a sufficient force to the handle 32, the transmission control element 30 can be moved to either of its drive positions against the bias of the spring 58.

INDUSTRIAL APPLICABILITY

From the foregoing it will be appreciated that a vehicle parking brake and transmission interlock system made according to the invention is simply and economically fabricated, requiring considerably fewer components than other systems heretofore known. It possesses the distinct advantage of automatically returning the transmission control element to its neutral position whenever the brake is engaged and an intentional effort to override the system is not being made. Yet, in the event of emergency, the system can be overridden as required.

Other aspects, objects and advantages of this invention can be obtained from a study of the drawings, the disclosure and the appended claims.

I claim:

1. A parking brake and transmission interlock system comprising:
    a transmission control element (30) movable between at least two positions including a neutral position and a drive position;
    a parking brake control element (14–22) movable between engaged and disengaged positions;
    a stop (36) connected to said transmission control to be movable therewith between said neutral and drive positions;
    at least one movably mounted abutment (52 or 56) confronting said stop;
    means biasing said abutment (52 or 56) toward a position engaged with said stop (36) to return said transmission control element to said neutral position, said biasing means (58) being such as to allow said stop (36) to be moved against the bias from said neutral position to said engaged position; and
    means interconnecting said abutment (52 or 56) and said brake control element (14–22) for moving said abutment (52 or 56) out of engagement with said stop (36) when said brake control element (14–22) is in said disengaged position.

2. The parking brake and transmission interlock system of claim 1 wherein said abutment (52 or 56) is continuously disposed within the path of movement of said stop (36), whereby whenever said brake control element (14–22) moves to said engaged position, said biasing means will engage said abutment (52 or 56) with said stop (36) to return said stop (36) and said transmission control element (30) to said neutral position.

3. A parking brake and transmission interlock system comprising:
    a transmission control element (30) movable between at least two opposed drive positions and an intermediate, neutral position;
    a parking brake control element (14–22) movable between engaged and disengaged positions;
    a stop (36) having two stop surfaces (38,40) fixedly connected to said transmission control element (30) to be movable therewith between said drive and neutral positions;
    a pair of movably mounted abutments (52,56) each confronting a respective one of said stop surfaces (38,40) and engageable therewith;
    means biasing each of said abutments (52,56) toward its associated stop surface (38 or 40) to engage the same and return said transmission control element toward said neutral position; and
    means responsive to the positioning of said brake control element (14–22) in said disengaged position for moving said abutments (52,56) away from the associated stop surface (38 or 40) so that said transmission control element (30) may be freely moved between said drive and neutral positions.

4. The parking brake and transmission interlock system of claim 3 wherein said stop (36) is mounted on and carried by said transmission control element (30).

5. A parking brake and transmission interlock system comprising:
    a transmission control element movable between at least two opposed drive positions and intermediate, neutral positions;
    a parking brake control element movable between engaged and disengaged positions;
    a stop having two stop surfaces connected to said transmission control element to be movable therewith between said drive and neutral positions, said stop surfaces being opposed;
    a pair of movably mounted abutments each confronting a respective one of said stop surfaces and engageable therewith, said abutments facing each other and flanking said stop;
    means biasing each of said abutments towards its associated stop surface to engage the same and urge said stop towards said neutral position; and
    means responsive to the positioning of said brake control element in said disengaged position for moving said abutments away from the associated stop surface so that said transmission control element may be freely moved between said drive and neutral positions.

6. The parking brake and transmission interlock system of claim 5 wherein said biasing means comprises a spring interconnecting said abutments.

7. A parking brake and transmission interlock system comprising:
    a transmission control element (30) movable in a path between at least two opposed drive positions and an intermediate neutral position;
    a parking brake control system including a fluid motor (16) having an output element movable between engaged and disengaged positions;
    a stop collar (36) rigidly mounted on said transmission control element (30) and having opposed stop surfaces (38,40);
    a pair of bellcranks (46,48) each pivotally mounted intermediate their ends and having first arms (50,54) continuously located in the path of movement of said stop collar (36) and facing a corresponding one of said stop surfaces (38,40) and second arms (60,62) in substantial abutment with said fluid motor output element (68); and
    a tension spring (58) interconnecting said first arms (50,54) to bias the same against said stop surfaces (38,40) to urge said stop collar (36) and said transmission control element (30) to said neutral position;
    said fluid motor output element (68), when in said disengaged position, driving said bellcranks (46, 48) against the bias of said spring (58) to positions wherein said first legs (50,54) are spaced to allow said collar (36) to move freely between said drive and neutral positions, and when in said engaged position, allowing said spring (58) to engage said first legs (50,54) with said stop surfaces (38,40).

* * * * *